Feb. 17, 1959  E. G. OPSAHL  2,873,824
BRAKE BEAM

Filed July 11, 1955  3 Sheets-Sheet 1

INVENTOR.
Eugene G. Opsahl
BY
Walter L. Schlegel, Jr. Atty.

Witness:
Ralph M. Faust

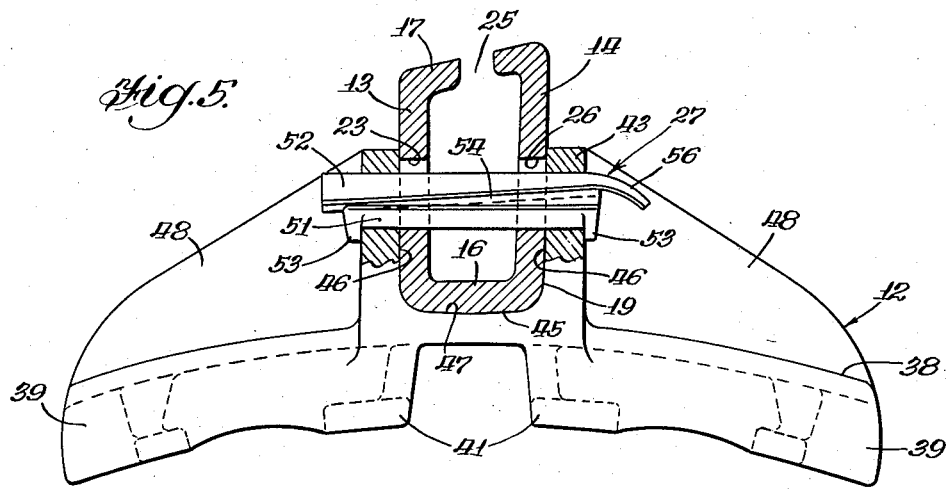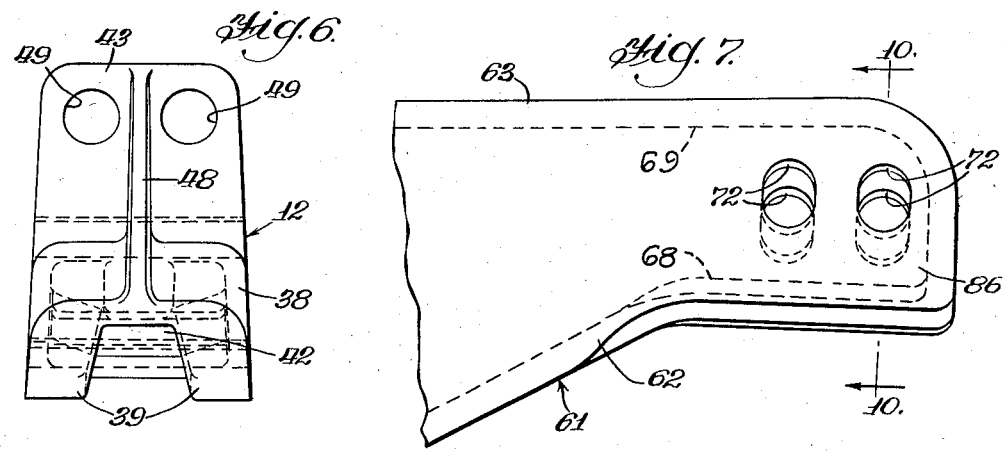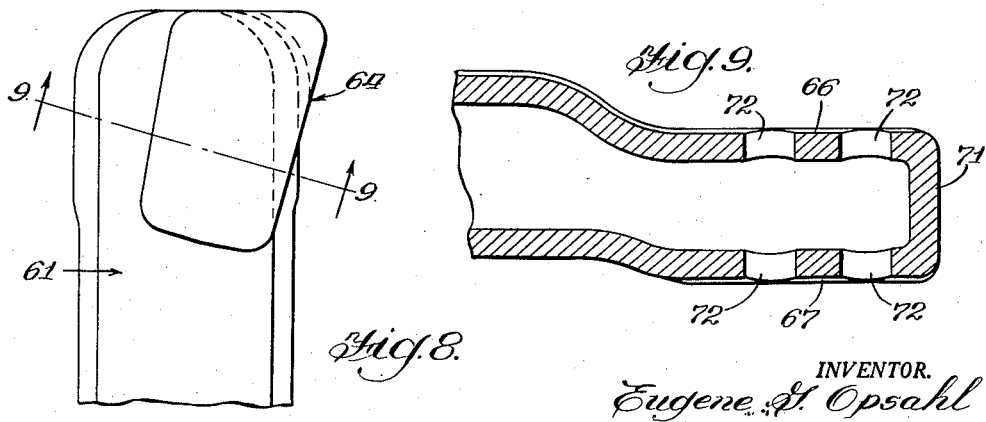

Feb. 17, 1959  E. G. OPSAHL  2,873,824
BRAKE BEAM
Filed July 11, 1955  3 Sheets-Sheet 3
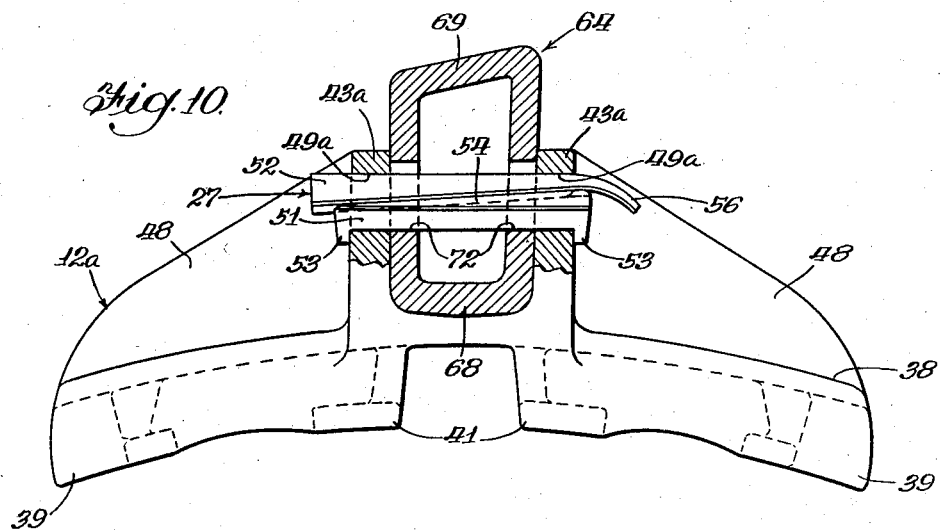
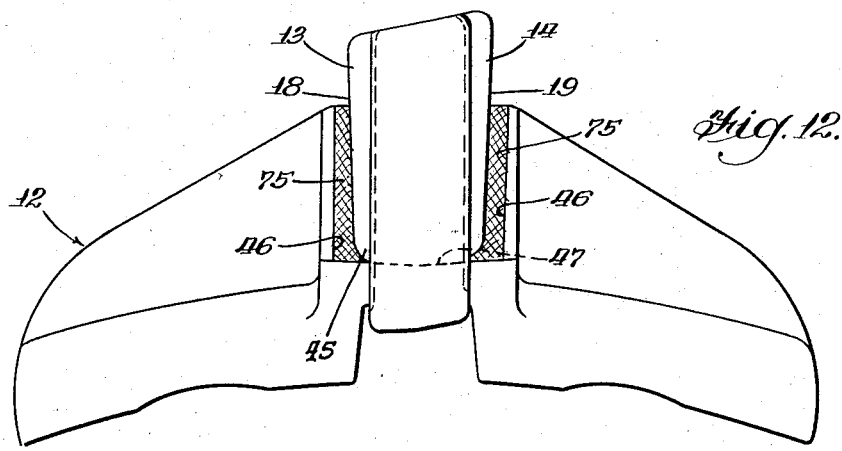
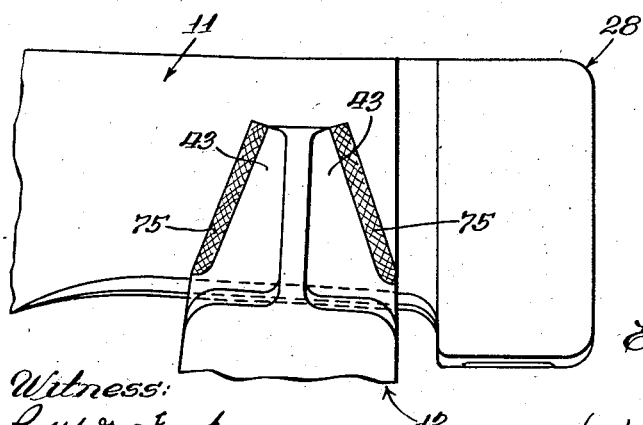
INVENTOR.
Eugene G. Opsahl
BY
Walter L. Schlegel, Jr. Atty.
Witness:
Ralph McFaust

United States Patent Office 2,873,824
Patented Feb. 17, 1959

2,873,824

BRAKE BEAM

Eugene G. Opsahl, Park Forest, Ill., assignor to American Steel Foundries, Chicago, Ill., a corporation of New Jersey Application July 11, 1955, Serial No. 521,335

5 Claims. (Cl. 188—226.1)

This invention relates to railway brake beams and particularly to brake beams having a unit truss structure on which separately formed brake heads are mounted.

An object of the invention resides in the provision of a truss type brake beam having brake heads detachably mounted on the ends thereof by means of wedge-lock keys to thereby facilitate manufacturing and assembling operations and replacement of damaged brake heads.

Another object of the invention resides in the provision of a brake beam casting having its ends cored to provide spaced top and bottom walls diverging rearwardly from a front wall, said walls being snugly embraced between spaced flanges provided on the brake heads.

A further object of the invention resides in the provision of a brake beam structure in which the brake head flanges are formed with apertures for registry with apertures in the top and bottom walls of the brake beam ends to receive wedge-lock keys adapted to wedge the brake heads into tightly seated position on the brake beam.

Another object of the invention resides in the provision of a brake beam structure, wherein the brake beam ends are received in recesses provided in the brake heads and the resultant assembly welded into a unitary structure.

Another object of the invention resides in the provision of a brake beam casting having hollow brake head seat portions merging with hollow outboard guide extensions, the seat portions being reinforced by ribs extending transversely internally of the beam.

The invention embodies other novel features, details of construction and arrangement of parts which are hereinafter set forth in the specification and claims and illustrated in the accompanying drawings, wherein:

Figure 5 is a transverse sectional view taken along the line 5—5 of Figure 1;

Figure 6 is an end elevational view showing the brake head;

Figure 7 is an enlarged fragmentary plan view, corresponding to Figure 2, illustrating a modified form of the invention;

Figure 8 is a fragmentary end elevational view of same;

Figure 9 is a longitudinal sectional view taken along the line 9—9 of Figure 8;

Figure 10 is a transverse sectional view taken along the line 10—10 of Figure 7, a brake head being shown as mounted upon the brake beam;

Figure 11 is a fragmentary top plan view of one end of a brake beam structure illustrating another modified form of the invention, and Figure 12 is an end elevational view of same.

Figure 1:
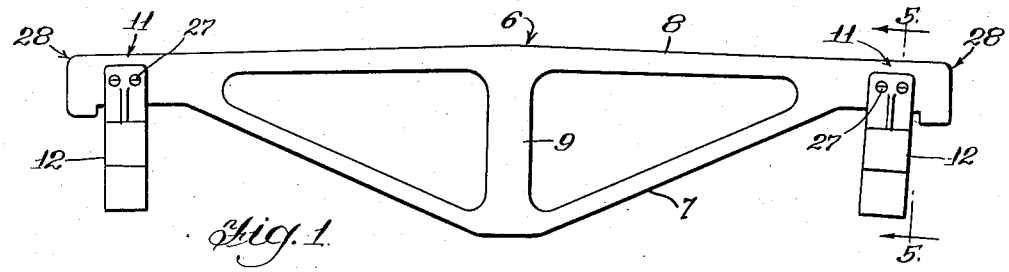
Figure 1 is a top plan view illustrating a truss type brake beam structure embodying features of the present invention.
Figure 2:
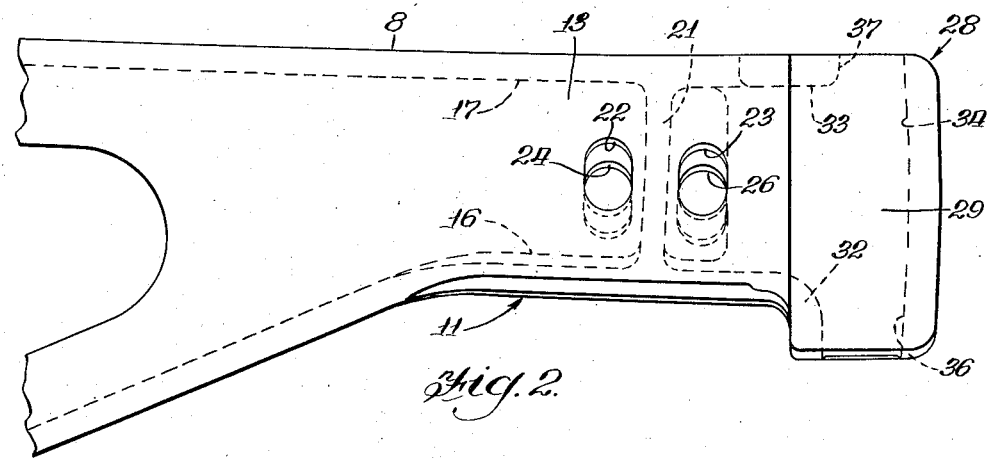
Figure 2 is an enlarged fragmentary top plan view illustrating one end of the brake beam.
Figure 3:
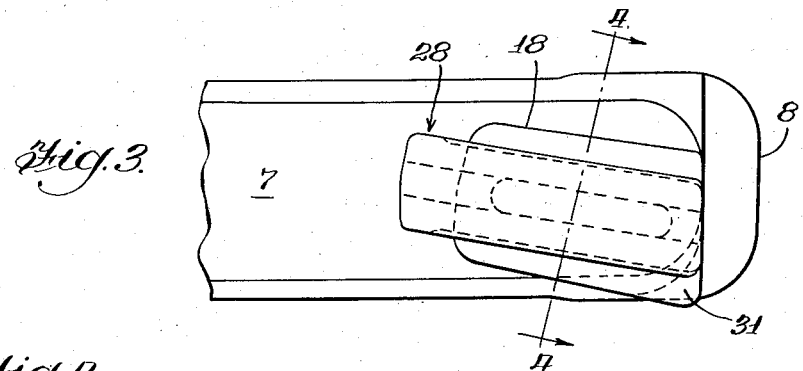
Figure 3 is a fragmentary end elevational view of same.
Figure 4:
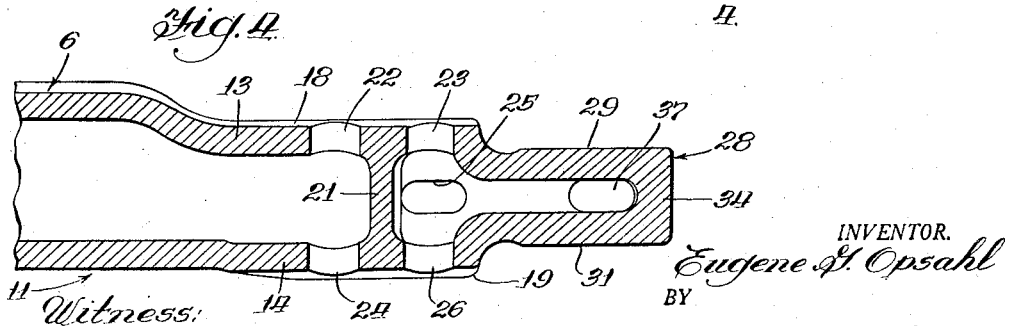
Figure 4 is a fragmentary longitudinal sectional view taken along the line 4—4 of Figure 3.

Referring now to the drawings for a better understanding of the invention and more particularly to Figures 1 to 6 therein, the brake beam 6 is shown in the form of a cast truss structure comprising a tension member 7 and a compression member 8, said members being interconnected at the center of the beam by a strut 9 adapted to be formed with the usual brake lever slot and pin opening.

The tension and compression members are of channel section and merge at each end of the beam with identical hollow end sections 11 adapted to receive brake heads 12, each end section 11 being diagonal to the plane of the truss and comprising a top wall 13 and bottom wall 14 interconnected by a front wall 16 and rear wall 17, the top and bottom walls having rearwardly diverging outer surfaces 18 and 19, respectively. The walls of the end section 11 are reinforced by an internal web 21 merging therewith and extending transversely of the end section.

Apertures 22 and 23 are formed in the top wall 13 on opposite sides of the web 21 in alignment with apertures 24 and 26, respectively, to receive wedge-lock keys, indicated generally at 27, adapted to detachably secure a brake head 12 in fixed position on its end section 11, as hereinafter described. An aperture 25 is formed in the rear wall 17 adjacent the outboard side of the web 21.

An outboard guide lug or extension 28 is provided on each end of the brake beam 6 to support the beam on an associated truck frame support ledge (not shown), the lugs being disposed in a common plane with the end sections 11 and diagonal to the plane of the truss. The guide lug is preferably of hollow form comprising a top wall 29 and bottom wall 31 merging with the walls 13 and 14, respectively, of the adjacent end section 11. The top and bottom walls 29 and 31 are joined together by front and rear inboard webs 32 and 33, respectively, and an outboard web 34, the web 34 being spaced from the outboard ends of the webs 32 and 33 to form apertures 36 and 37. The lug 28 is preferably formed having a thickness less than the end section 11 and having its front portion projecting forwardly beyond the end section.

The brake head 12 is shown as comprising a metal casting having an arcuate front wall 38 provided with end lugs 39 and intermediate lugs 41 to engage and seat a conventional associated brake shoe (not shown) secured to the brake head by a conventional key (not shown) extending through a keyway 42. Spaced flanges 43—43 project rearwardly from the front wall 38 to form a recess having opposed inwardly converging surfaces 46—46 merging with an inner surface 47 to snugly engage complementary surfaces 18, 19, and 45 on the end section 11 of the brake beam. Reinforcing ribs 48—48 extend rearwardly from opposite ends of the front wall 38 to merge with their associated flanges 43—43, the ribs being centrally located between the sides of the brake head.

Apertures 49—49 are formed on each flange 43 on opposite sides of the ribs 48—48 for registry with the apertures 22, 23, 24, and 26 formed in the end section 11 to receive wedge-lock keys 27, as illustrated in Figure 5, all of said apertures being elongated with their major axes extending transversely of the beam, and said apertures in the end section being longer than the apertures in said flanges.

The brake heads 12 are detachably mounted on the end sections 11 by means of wedge-lock keys 27 comprising a lock member 51 and a wedge member 52 extending side by side through the apertures formed in the end sections and brake head flanges 43. The lock member 51 is formed with bosses 53—53 at its ends to engage the outer surfaces of the flanges 43 and with an inclined surface 54 for engagement by a complementary surface on the wedge 52. Inward movement of the wedge along the lock member acts to draw the brake head into tightly seated engagement on the end section 11; after which, the inner end of the wedge is bent at 56 to prevent accidental outward movement of the wedge.

Figures 7 through 10 illustrate a modified form of the invention in which a hanger-type brake beam 61 is shown as comprising a cast truss structure, similar to the structure shown in Figure 1, having a tension member 62 and a compression member 63 of channel section merging at each end of the beam with identical hollow end sections 64 adapted to have brake heads 12a detachably secured thereon by means of wedge-lock keys 27.

Each end section 64 is inclined to the plane of the truss structure and comprises a top wall 66, bottom wall 67, front wall 68, rear wall 69 and end wall 71. Apertures 72 are formed in the top and bottom walls for registry with apertures 49a formed in the brake head flanges 43a to receive wedge-lock keys 27 to secure the brake head onto the end section in the manner heretofore described in connection with the form of the invention illustrated in Figures 1 through 6.

Figures 11 and 12 illustrate another modified form of the invention. The truss portion of the brake beam of which only end section 11 is shown is basically identical with that illustrated in Figures 1 through 5. The only variation in the construction of Figures 11 and 12 is that the apertures 22, 23, 24, and 26 which appear in Figures 1 through 5 have been omitted from the top wall 13 and the bottom wall 14.

Similarly, the brake head, shown in Figures 11 and 12, is basically identical with that shown in Figure 6 and previously described with the exception that the apertures 49 have been omitted from the spaced flanges 43. The brake heads, as in the other embodiments of the invention, are provided with opposed inwardly converging surfaces 46 merging with an inner surface 47 to snugly engage complementary surfaces 18, 19, and 45 on the end sections 11 of the brake beam. The brake heads after being properly positioned are welded to the sections 11 as at 75 to form therewith a unitary structure brake beam.

I claim:

1. In a brake beam casting, a truss structure comprising coplanar tension and compression members of channel section converging toward the ends of the casting and merging to provide tubular sections of gradually decreasing cross sectional area, and hollow end sections merging with their respective tubular sections, mounting portions on said hollow end sections for securing brake heads to said brake casting, said mounting portions being adjacent said tubular sections, each end section having rearwardly diverging upper and lower surfaces for wedge engagement between spaced brake head surfaces.

2. In a brake beam, a cast structure comprising coplanar tension and compression members of channel section converging toward the end of the structure and merging to provide tubular sections of a gradually decreasing cross sectional area, hollow coplanar end sections having substantially uniform internal cross sectional areas, said end sections merging with and projecting outboardly from their respective tubular sections, and disposed diagonally to the plane of the truss structure, said end sections having rearwardly diverging upper and lower surfaces, and brake heads comprising spaced flanges snugly straddling said hollow end sections and rigidly secured thereto, said brake heads being wedged to said brake beam by said diverging upper and lower surfaces on said end sections.

3. In a brake beam, a truss structure comprising coplanar tension and compression members of channel section converging toward the ends of the structure and merging to provide tubular sections of a gradually decreasing cross sectional area, hollow end sections of substantially uniform cross sectional area merging with respective tubular sections, said end sections having diverging upper and lower surfaces, and brake heads comprising spaced flanges snugly straddling said surfaces and rigidly secured thereto.

4. In combination, a brake beam casting, a truss structure comprising coplanar tension and compression members converging to form channel-shaped tubular sections of decreasing cross sectional area, hollow end sections having substantially uniform cross sectional areas, said end sections merging with their respective tubular sections, said end sections having top, bottom, front and rear walls, the top and bottom walls diverging rearwardly, a rib extending transversely of said casting, said rib connecting said top, bottom, front and rear walls, a pair of aligned apertures disposed on each side of said rib and located in said top and bottom walls, a brake head straddling said top, bottom and front walls, said brake head having a pair of inwardly converging flanges, each of said flanges having a pair of aligned apertures, a wedge and key means to secure said brake head to one of said hollow end sections, and a hollow guide lug merging with and projecting outboardly from each of said hollow end sections, said guide lug and said hollow end sections being coplanar and diagonal to the plane of the truss structure.

5. In combination, a brake beam, a cast truss structure, said structure having tension and compression members, said members merging to form channel-shaped tubular sections, said tubular sections having generally continuously decreasing cross sectional areas, an end section having a box-like section of substantially uniform cross sectional area and being coplanar and diagonal to the plane of the beam, said end section having a top, bottom, front and rear wall, said top and bottom walls diverging rearwardly, a pair of apertures in said top wall, another pair of apertures in said bottom wall and aligned with said first mentioned pair of apertures, a brake head straddling said top, bottom and front walls, said brake head having a pair of inwardly converging flanges, each of said flanges having a pair of aligned apertures, and a wedge and lock key means for securing said brake head to said brake beam casting, said brake head being located at one of said box-like sections.

References Cited in the file of this patent

UNITED STATES PATENTS

| | | |
|---|---|---|
| 528,522 | Barnes | Nov. 6, 1894 |
| 750,732 | Stucki | Jan. 26, 1904 |
| 803,313 | Streib | Oct. 31, 1905 |
| 2,722,292 | Opsahl | Nov. 1, 1955 |
| 2,726,740 | Cottrell | Dec. 13, 1955 |
| 2,751,051 | Cottrell et al. | June 19, 1956 |
| 2,755,892 | Sherman | July 24, 1956 |